United States Patent [19]

Fenn

[11] Patent Number: 4,561,995

[45] Date of Patent: * Dec. 31, 1985

[54] MATERIAL FOR DRYING CUT PLANTS AND METHODS OF FACILITATING SUCH DRYING

[75] Inventor: George S. Fenn, Elkton, Oreg.

[73] Assignee: Fenn & Company, Cottage Grove, Oreg.

[*] Notice: The portion of the term of this patent subsequent to May 15, 2001 has been disclaimed.

[21] Appl. No.: 363,784

[22] Filed: Apr. 5, 1982

[51] Int. Cl.$^4$ .................. C09K 3/00; C09K 15/02; C09K 15/32; A23L 3/03

[52] U.S. Cl. .................. 252/194; 252/400 R; 252/397; 426/310; 426/331; 426/335; 426/532; 426/635; 426/636; 426/807; 47/57.6; 47/58; 47/DIG. 11

[58] Field of Search .................. 252/106, 135, 174.14, 252/174.15, 194, 397, 400 R, 407; 47/57.6, 58, DIG. 11; 424/270; 426/302, 309, 310, 331, 335, 271, 532, 623, 626, 635, 636, 807; 427/4; 428/540, 541

[56] References Cited

U.S. PATENT DOCUMENTS

| | | | |
|---|---|---|---|
| 1,472,320 | 11/1923 | Beckmann | 426/636 |
| 1,472,322 | 11/1923 | Beckmann | 426/636 |
| 1,802,083 | 4/1931 | Legendre | 426/331 X |
| 2,333,443 | 11/1943 | Robinson | 252/135 |
| 2,433,123 | 12/1947 | Hudson | 426/331 X |
| 2,480,579 | 8/1949 | Holuba | 252/531 |
| 2,923,095 | 2/1960 | Magimel-Pelonnier et al. | 47/DIG. 11 |
| 3,673,087 | 6/1972 | Brian et al. | 252/1 |
| 3,996,386 | 12/1976 | Malkki et al. | 426/321 |
| 4,028,262 | 6/1977 | Cheng | 252/174.14 |
| 4,048,341 | 9/1977 | Lagerstrom et al. | 426/807 X |
| 4,049,665 | 9/1977 | Douglass | 252/106 X |
| 4,089,979 | 5/1978 | Jackson | 426/807 X |
| 4,093,566 | 6/1978 | MacNamara et al. | 252/174.14 X |
| 4,291,497 | 9/1981 | Manankov | 47/58 |

FOREIGN PATENT DOCUMENTS

| | | | |
|---|---|---|---|
| WO81/00955 | 4/1981 | PCT Int'l Appl. | 47/DIG. 11 |
| 2025450 | 1/1980 | United Kingdom | 252/174.14 |

OTHER PUBLICATIONS

*The Merck Index*, 8th ed. 1968, "Sodium Propionate", p. 965.

Klinner, et al., "Advances with Chemical Preservation for Hay", *Grain and Forage Harvesting*, 1978, pp. 303-307.

Tullberg, et al., "The Effect of Potassium Carbonate Solution on the Drying of Lucerne, 2, Field Studies", *J. Agric. Sci., Comb,* (1978), pp. 557-581.

Hawley, ed. *Condensed Chemical Dictionary*, 9th ed. 1977, Van Nostrand Reinhold Co., "Dioctyl Sodium Sulfosuccinate", pp. 313-314.

*Primary Examiner*—John F. Terapane
*Assistant Examiner*—Matthew A. Thexton
*Attorney, Agent, or Firm*—Ellsworth R. Roston; Charles H. Schwartz

[57] ABSTRACT

Drying agents for cut plants provide a basic pH in a solution between approximately 12.4 and 13.2 when the drying is to be provided primarily on the stems of the cut plants. The drying agents include a first material which provides a pH of at least 12.4 in the solution. The first drying agent may constitute an alkaline metasilicate such as sodium metasilicate. The drying agents may also include a second material such as an alkaline carbonate. Sodium or potassium carbonate are preferable. The second drying agent constitutes a buffer to limit the pH in the solution to a value of approximately 13.2.

The metasilicate is in the form of a colloid of silicon dioxide and this colloid tends to act primarily on the waxes on the stems to saponify the waxes on the surfaces of the stems. The drying agents form a chemical complex which serves as a protective coating to prevent water from entering into the stems of the plants.

Because of the chemical complex which protects the surfaces of the plants against the entry of water, the drying agents may also be used at a reduced pH to protect the leaves of plants. For example, the drying agents may be used at a pH between approximately 10 and 11 to protect the leaves of the plants. The drying agents may also be used at a suitable pH such as between approximately 10 and 11 to protect other materials such as grains.

35 Claims, 5 Drawing Figures

MATERIAL FOR DRYING CUT PLANTS AND METHODS OF FACILITATING SUCH DRYING

This invention relates to materials for drying cut plants and more particularly relates to materials for drying cut plants in a minimal period of time and for maintaining the plants dry after the water has been removed from the plants such that the plants can be baled. The invention also relates to methods of drying the plants.

Cut plants such as grass or alfalfa and other types of legume are used during the winter months to provide feed for farm animals such as horses and cows. The plants are cut and are then dried in the sun for a few days to reduce, and hopefully minimize, moisture. It is important to eliminate, or at least reduce, the moisture because the plants otherwise tend to mold. When the plants mold, they are no longer satisfactory for animal feed.

Various attempts have been made to reduce, and hopefully eliminate, the moisture in cut plants. Until recently, such efforts have met, at best, limited success. This has been particularly true because the leaves on many types of cut plants tend to dry faster than the stems. The differences in the rates of drying in such plants have existed in part because the stems are more bulky than the leaves and the leaves are more delicate than the stems. It has also resulted in part from the fact that the stems have wax coatings which inhibit the operation of any drying agent in removing moisture from the plants.

There are also other problems which inhibit the proper drying of the cut plants. For example, when the plants are cut, they tend to be deposited in windrows for drying by the sun and the wind. The moisture content at different positions in the windrow tends to vary over considerable limits. Furthermore, the rate of drying of the cut plants at the different positions in the windrow is not uniform. As a result, all of the cut plants do not become dry at the same time. This has caused positions of moisture to exist in the windrow and these positions of moisture have produced molding, particularly of the leaves. The molding of the leaves then tends to spread so that the plants are no longer usable as feed.

U.S. application Ser. No. 256,106 filed by me on April 21, 1981, for "Material for Drying Cut Plants and Apparatus for Facilitating Such Drying" discloses and claims materials, apparatus for, and methods of at least partially solving the problems disclosed above. The materials disclosed and claimed in application Ser. No. 256,106 include a drying agent providing a basic pH of at least eleven (11) in a solution and having properties of becoming at least partially insoluble at a pH no greater than approximately 13.4. The drying agent has properties of saponifying the wax on the stems as the plant dries and as the pH of the drying agent accordingly increases. The drying agent is selected from a group consisting of the carbonates, phosphates and silicates of of at least one of sodium and potassium and a combination of the hydroxides, carbonates and bicarbonates of at least one of sodium and potassium.

The materials disclosed and claimed in application Ser. No. 256,106 also include a mold inhibiting agent having properties of remaining inactive until the occurrence in the plant of conditions inducing molding and having properties of reacting with the moisture, under conditions of temperature and moisture inducing molding, to inhibit the formation of the mold. The mold inhibiting agent may be selected from a group consisting of acids and acid salts of at least one of propionic sorbic and carboxylic acids and other fatty acids. The mold inhibiting agent remains inactive until fermentation of the plants causes the pH to be reduced to a value of approximately 6. The mold inhibiting agent then becomes active to prevent mold from forming on the plants to damage the plants.

The materials described above may be applied to plants, before the plants are cut, by bending the plants to facilitate the direction of the spray along the stems and leaves of the plants. After the plants are cut, the plants may be assembled into a relatively high, loosely-packed windrow. When the plants in the windrow have dried, the windrow is raked or turned over and the windrow is baled shortly thereafter. Alternatively, the plants may be laid flat on the ground after being cut. If desired, the plants may thereafter be assembled into a loose pile constituting the equivalent of a windrow.

This invention provides two (2) different drying agents each of which performs an individual function in drying cut plants. The drying agents co-operate to provide a basic pH between approximately 12.4 and 13.2 in a solution when the drying is to be provided primarily on the stems of the cut plants. The drying agents include a first material which provides a pH of at least 12.4 in the solution. The first drying agent may constitute a metasilicate such as sodium metasilicate. The drying agents may also include a second material such as a carbonate. Sodium or potassium carbonate are preferable. The second drying agent constitutes a buffer to limit the pH to a value of approximately 13.2 in the solution.

The metasilicate is in the form of a colloid of silicon dioxide and this colloid tends to act on the waxes on the stems to saponify the waxes. The drying agents operate primarily on the stems of cut plants to saponify the waxes on the surfaces of the stems. The drying agents form a chemical complex which serves as a protective coating on the stems to prevent water from re-entering into the stems or forming on the stems.

Because of the chemical complex which protects the surfaces of the plants against the entry of water, the drying agents may also be used at a reduced pH to protect the leaves of plants. For example, the drying agents may be used at a pH between approximately 10 and 11 in the solution to protect the leaves of the plants. The drying agents may also be used in the solution at a suitable pH such as between approximately 10 and 11 to protect other materials such as grains.

The materials of this invention may also include a surface active agent and a waterproofing agent. These agents are disclosed and claimed in application Ser. No. 363,785 filed by me on April 5, 1982, for "Material for Drying Cut Plants and Grains and Methods of Facilitating Such Drying" on the same date as the filing date of this application.

The surface active agent is primarily used when the cut plants constitute grasses. These plants have a leaf structure which acts to prevent the drying agents and mold-inhibiting agents from entering into the spaces occupied by the rolled configurations of the leaves. The surface active agent increases the ability of the drying agents and the mold-inhibiting agent to enter into the space occupied by the rolled configurations of the leaves.

The particular waterproofing agent provides for the transfer of water vapor between the plants and the atmosphere. However, the waterproofing agent prevents drops of water from re-entering into the plants. The waterproofing agent is primarily effective on the leaves. The waterproofing agent may constitute sodium methyl siliconate.

Figure 1:
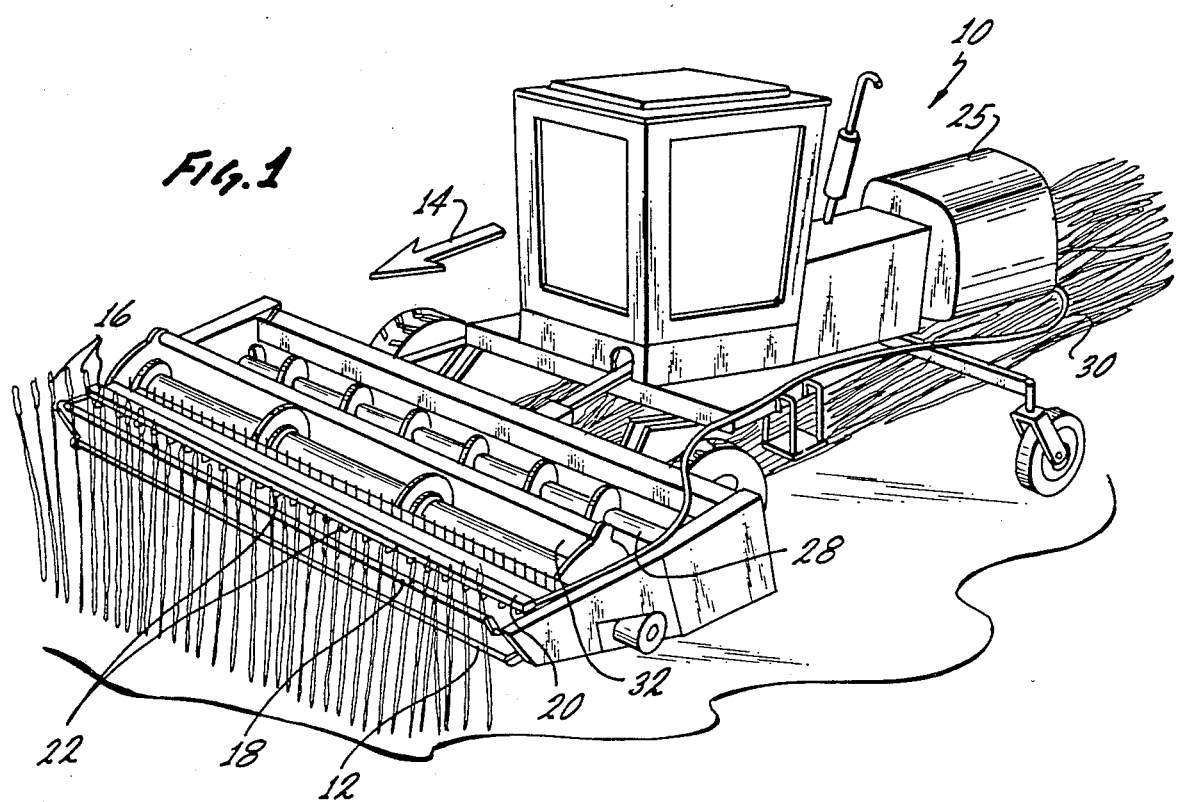
FIG. 1 is a fragmentary schematic perspective view of apparatus for spraying and cutting plants in a field.
Figure 2:
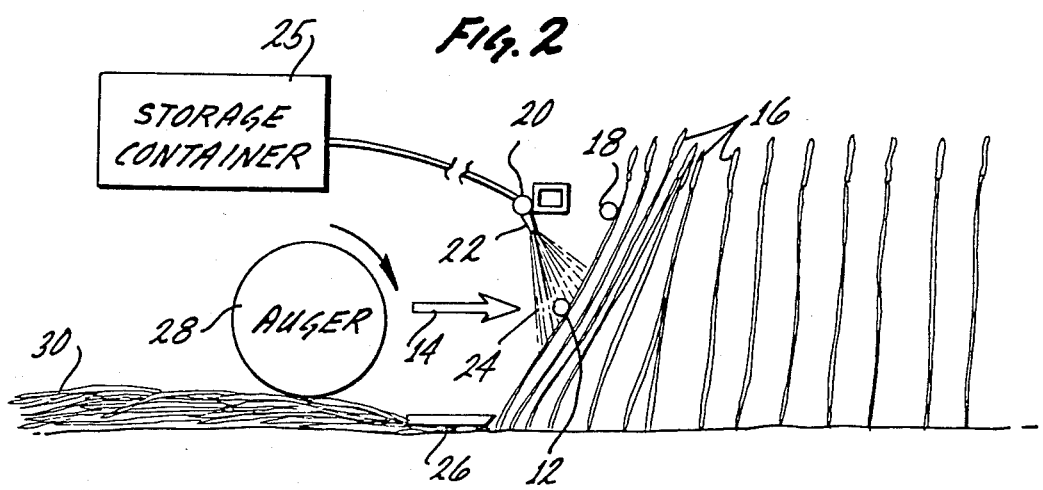
FIG. 2 is a fragmentary schematic side elevational view of certain components shown in FIG. 1 and particularly illustrates the action of such components in bending, spraying and cutting the plants in the field.
Figure 3:
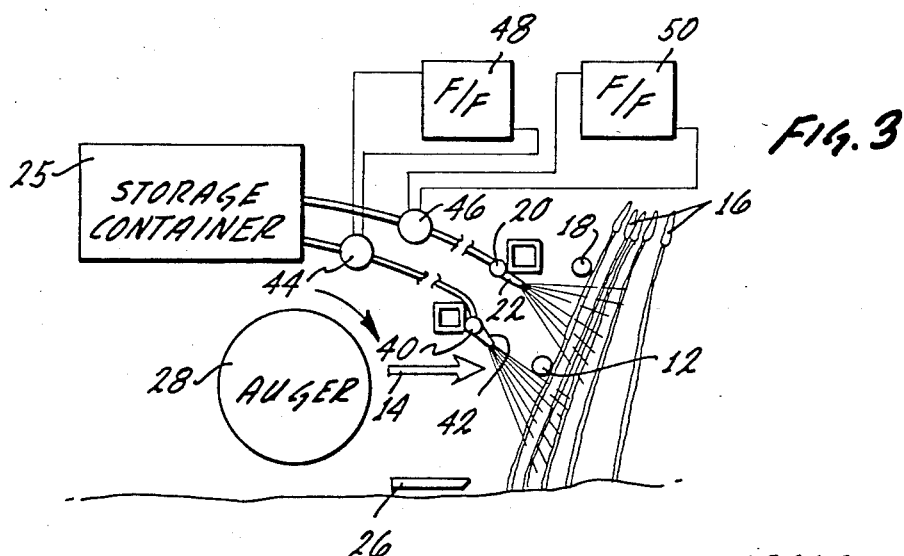
FIG. 3 is a schematic view, partly in side elevation from a mechanical standpoint and partly in block form from an electrical standpoint, of a second embodiment of apparatus useful with the invention.
Figure 4:
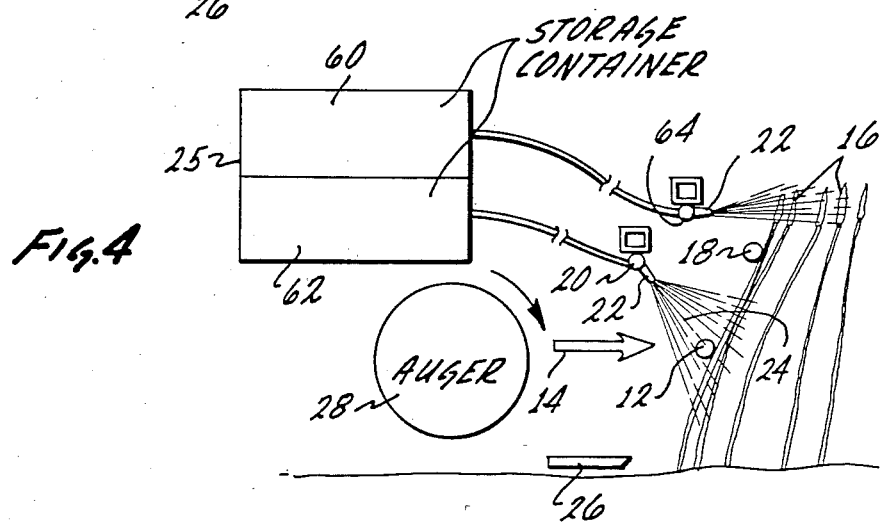
FIG. 4 is a schematic view, partly in side elevation from a mechanical standoint, of a third embodiment of apparatus useful with the invention.
Figure 5:
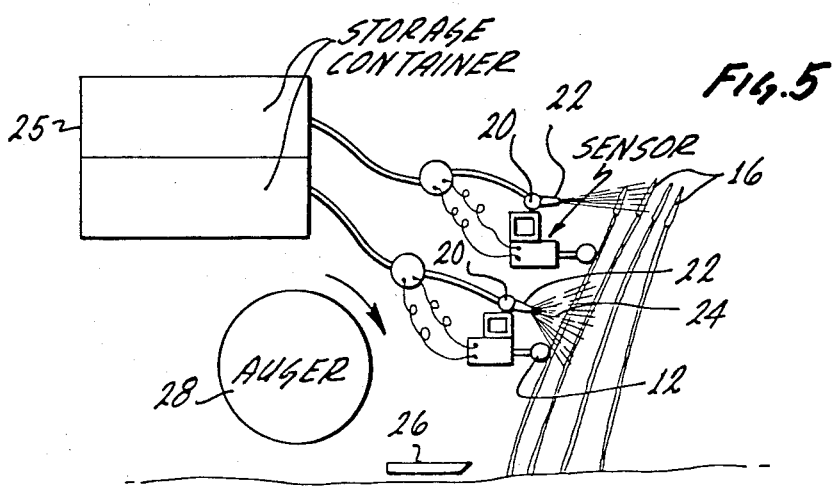
FIG. 5 is a schematic view, partly in side elevation from a mechanical standpoint, of a fourth embodiment of apparatus useful with the invention.

In one embodiment of the invention, a chemical complex is provided for drying cut plants such as grass and alfalfa and other types of legumes. The drying agents preferably have a pH between 12.4 and 13.2 in a solution. The solution may contain any suitable solvent but the solvent is preferably water.

The drying agents preferably include a first material which provides a pH of at least a particular value in the solution. This first material is preferably a metasilicate such as sodium metasilicate when the drying agents provide a pH of at least 12.4 in the solution. A pH of at least 12.4 is provided for the drying agents when the drying agents are to be used primarily to dry the stems of the cut plants. A reduced pH such as a pH between 10 and 11 may be provided for the drying agents when the drying agents are to be used to dry the leaves of cut plants such as legumes. Under such conditions, the drying agents with a pH of approximately 10 to 11 may be applied to the leaves and drying agents with a pH of approximately 12.4 to 13.2 may be applied to the stems.

The drying agents preferably include a second material which acts as a buffer for the first drying agent to limit the pH of the first drying agent to a particular value in the solution. The carbonate may be included directly or it may be obtained by mixing sodium hydroxide with a suitable carbonate in the solution.

When the chemical complex is to be used primarily to dry the stems of cut plants, the buffer acts to limit the pH of the drying agents in the solution to a particular value such as 13.2. In this way, the pH of the drying agents is maintained in the solution within a relatively limited range such as approximately 12.4 to 13.2. A pH of at least 12.4 for the drying agents in the solution is desirable in order to expedite the action of the drying agents in drying the cut plants when the solution containing the chemical complex is sprayed on the cut plants. A limit of approximately 13.2 for the pH of the drying agents is desirable in order to be certain that the plants do not become scorched or burned by the drying agents. Furthermore, by maintaining the pH of the drying agents at a limit of approximately 13.1, the chlorophyll in the cut plants does not become damaged.

When a metasilicate is used, silicon dioxide does not appear to be really in solution. Rather, silicon dioxide appears to exist as a colloid in the solution. This colloid appears to act on the waxes existing on the stems of the cut plants and to saponify such waxes so that the waxes can be removed. In this way, the moisture on and in the stems can be removed by the drying agents and by the atmosphere.

The metasilicate also appears to react with the carbonates and form a protective coating which becomes disposed on the surface of the plants, primarily the stems of the plants. This protective coating prevents water from becoming disposed on the stems of the plants after the water has been dried from the stems. It also prevents water from becoming re-absorbed in the cut plants.

When a pH of approximately 12.4 to 13.2 is provided in the solution for the drying agents, approximately two and one-half pounds (2½lb) of carbonate is mixed with approximately two and one-half pounds (2½lb) of metasilicate in a suitable amount of solvent such as water to produce one (1) ton of dried cut hay. This corresponds to a concentration by weight of drying agents in the dried cut plants of approximately 0.25%. This mixture of drying agents provides a pH approaching 13 in the solution. This ratio between the two (2) drying agents produces a much faster and more effective drying of the cut plants than would be predicted by the use of the materials separately or even together or than would be predicted by the use of these material in other ratios. Of course, the amounts of metasilicate and carbonate in the solution are dependent upon atmospheric conditions such as humidity. For example, the amounts of the drying agents used are higher for atmospheric conditions of high humidity than for atmospheric conditions of low humidity.

Since the sodium metasilicate constitutes the primary drying agent, sodium carbonate can be used instead of potassium carbonate. This results from the fact that sodium carbonate is as effective as a buffer as potassium carbonate even though potassium carbonate is more effective as a drying agent than sodium carbonate. The use of sodium carbonate as a buffer is advantageous because it is considerably less expensive than potassium carbonate.

The use as the drying agents of metasilicates in combination with carbonates also offers other advantages. Although all silicates are non-stoichrometric, metasilicates ($Na_2O.SiO_2$) are more stoichiometric than weaker silicates such as sodium silicate. As a result, the pH of metasilicates for different percentages of the metasilicate ($Na_2O.SiO_2$) in a solution can be predicted with greater certainty than when relatively weak silicates are used. Furthermore, sodium metasilicate has a considerable wetting action in itself. This reduces considerably any need for employing any additional wetting agents in the solution. This is particularly true since the mold-inhibiting agent included in the solution also has some wetting action. However, the use of additional wetting agents is still preferable, as will be seen from the subsequent discussion.

The combination of a silicate and a carbonate as a drying agent may also be used to dry the leaves of plants and to form a protective coating on the leaves in the manner discussed above. Under such circumstances, the pH of the drying agent is preferably between about 10 and 11. Since the leaves tend to become dried even when the combination of the silicate and the carbonate is applied to the leaves, the primary purpose of applying the silicate and the carbonates to the leaves is to form the protective coating. Furthermore, sodium metasilicate ($Na_2O.SiO_2$) or a solution of sodium silicate (e.g. $Na_2O.2CSiO_2$) even weaker than sodium metasilicate can be used since the pH of the drying agents is only in the order of 10 to 11.

As will be appreciated, solutions of different pH strength may be separately applied to the stems and to the leaves of the plants. For example, a combination of drying agents with a pH of approximately 12.4 to 13.2 in the solution may be applied to the stems to dry the stems and form a protective coating on the stems, and a combination of drying gents with a pH of approximately 10 to 11 in the solution may be separately applied to the leaves to form a protective coating on the leaves.

Potassium carbonate, sodium carbonate and sodium metasilicate may be desirable because they may be contacted and ingested safely by human beings and animals. Other materials may also be safely used as drying agents, particularly as the buffers. For example, a combination of approximately ten percent (10%) by weight of sodium hydroxide (NaOH) and ninety percent (90%) by weight of sodium bicarbonate ($NaHCO_3$) may also be used, particularly as the buffer. Trisodium phosphate ($Na_3PO_4$) may also be used, particularly as the buffer.

A material such as sodium propionate is also included for inhibiting the molding of the cut plants, particularly the leafy portions of the cut plants. The sodium propionate may have a concentration of approximately two pounds (2 lbs.) to six pounds (6 lbs.) per ton of the dried cut plants. This corresponds to a concentration of approximately 0.1% to 0.3% by weight of the propionate in the dried cut plants. The concentration of the sodium propionate on the cut plants depends upon the moisture on the plants. For example, approximately two and one half pounds (2½lbs.) of sodium propionate per ton of dried cut plant may be used in dry weather, and approximately five pounds (5 lbs.) per ton of dried cut hay may be used in humid weather. Sodium propionate is desirable because it is safe when it is ingested or contacted by human beings or animals. The sodium propionate may be formed by pre-mixing sodium hydroxide and propionic acid to form sodum propionate and water and then drying the water. Alternatively, the sodium hydroxide and propionic acid may be mixed at the time that the materials of this invention are being formed.

Sodium propionate is inactive chemically and is also relatively non-volatile when it has a pH of more than six (6). This will cause the sodium propionate to remain inactive chemically during the drying operation because the pH of the drying agent is considerably in excess of six (6). However, the cut plants ferment as a precursor to molding. Since fermentation is an acidic process, the pH of the solution will decrease. This will cause the sodium propionate to become active chemically when the pH decreases below a value of approximately six (6). As a result, the propionate acts as a fungicide in inhibiting the molding of the cut plants, particularly the leaves on the cut plants.

Other materials may be used as mold inhibitors in addition to sodium propionate. For example, other propionate salts such as ammonium propionate, potassium propionate and calcium propionate may also be used. However, calcium propionate may tend to react with the potassium carbonate or sodium carbonate to form calcium carbonate, which may precipitate. Furthermore, salts of other acids such as sorbic and carboxylic acids or acetic acid (most of which are fatty acids) or salts such as sodium or potassium acetate may also be advantageous. Propylene glycol may also be advantageous, particularly when used with sodium propionate, because it constitutes a good fungus inhibitor and tends to facilitate the saponification of the stems of the plants and to facilitate withdrawal of water from the plants. All of the different chemicals specified above as mold-inhibitors are also advantageous because they may be contacted and ingested safely by human beings and animals.

Other materials may also be used as a mold inhibitor. For example, a 2 N-octyl 4-isothiazolin-3-1 may be used as the mold inhibitor. Such material is supplied by Rohm & Haas. Such a material may be used in a concentration of approximately 0.005 pounds to 0.25 pounds per ton of dried cut plants. This material may also be contacted and ingested safely by human beings and animals.

A waterproofing agent may also be included in the solution containing the drying agent and the mold-inhibiting agent. The waterproofing agent waterproofs the cut plants after the cut plants have dried for a suitable period of time, such as approximately twenty four (24) hours. The waterproofing agent has the properties, at the pH of the drying agent in the solution, for providing for a passage of moisture or water vapor from the plants while preventing drops of water from being reabsorbed on the plants. This is of considerable importance since the waterproofing agent can prevent rewetting of the cut plants by rain showers or by drops or droplets of dew during the final stages of the drying process or in the period of time between the final stages of the drying process and the baling and storage. The waterproofing agent may be applied primarily to the leaves of the cut plants.

The waterproofing agent may constitute sodium methyl siliconate, which is marketed by Dow Corning as DC-772. When sodium methyl siliconate is used as the waterproofing agent, it is not toxic to humans or animals to ingest or touch. Furthermore, it is compatible with a high pH, with the drying agent and with any cutin disarrangements which may occur during the chemical drying of the cut plants. Other types of methyl siliconates than sodium methyl siliconate may also be used.

The waterproofing agent may be included in a hydroxide base such that the waterproofing agent constitutes approximately thirty percent (30%) of the hydroxide solution by weight. The waterproofing agent may have a weight in the solution (including the drying agent and the mold-inhibiting agent) in the range of approximately one tenth of one percent (0.1%) to three percent (3%). Preferably the waterproofing agent is included in such solution in the range of one percent (1%) to two percent (2%) by weight of the dried cut plants. The amount of waterproofing agent included in the solution is dependent upon the amount of water vapor on the plants and is also dependent upon the value of the cut plants. The amount of waterproofing agent may be increased if the value of the cut plants is increased. The amount of waterproofing agent in the solution is also increased as the amount of water vapor on the plants increases.

A surface active agent having unique properties is also preferably included in the solution containing the drying agent, the mold-inhibiting agent and the waterproofing agent. The surface active agent may constitute alkyl glucoside. This material is advantageous because it is able to penetrate into the leaves of cut plants such as grass and plants of the peanut family to reduce the surface tension of the leaves in these plants. The surface tension of the leaves in these plants is ordinarily quite high because the leaves have fine hairs which prevent materials from penetrating into the plants. The surface active agent may be applied, before cutting, to the leaves of the plants or to the stems of the plants or to the leaves and the stems of the plants.

When the surface tension of the leaves in grasses and plants of the peanut family is reduced by the surface active agent, the other materials in the solution such as the drying agent, the mold inhibiting agent and the waterproofing agent are able to penetrate into the plant to produce a drying of the moisture within the leaves. This is important in such plants as grass because the leaves in the grass tend to be rolled within one another and thereby inhibit any action of the drying agent in drying the moisture within the rolled leaves.

A surface active agent such as alkyl glucoside is particularly effective in such cut plants as grasses. In cut plants such as grasses, the petiole is attached to the stem and only one leaf appears to be attached to the petiole. Actually, however, a plurality of leaves are rolled inside one another in grasses and are attached to the petiole. This makes it difficult for the drying agent and the mold-inhibiting agent to penetrate into the space occupied by the rolled leaves. By providing a surface active agent such as alkyl glucoside, the alkyl glucoside penetrates into the space occupied by the leaves in the grasses and facilitates the penetration of the drying agent and the mold-inhibiting agent into such space. This facilitates the drying of the moisture within the rolled leaves in the grasses. Alkyl glucoside is particularly effective as a drying agent because it is active at a pH above 11 in the solution.

The drying of grasses is important because grasses are commonly used as feed for animals. Although grasses may have less nutritional value than legumes, they are more rugged than legumes and can be treated more roughly than legumes without losing their nutritional properties. For example, grasses can be treated more roughly than legumes without losing their leaves.

The surface active agent such as alkyl glucoside may be effective primarily against the stem. This is particularly true when the concentration of the alkyl glucoside in the solution is in the range of approximately 0.01% to 0.02% by weight. However, when it is desired to penetrate the leaves in such cut plants as grasses and plants of the peanut family, the concentration of the surface active material such as alkyl glucoside in the solution may be increased to a range of approximately 0.03% to 0.1% by weight. In such concentrations, the alkyl glucoside tends to penetrate into the fine hairs in such leaves and to reduce the surface tension of the leaves so that the drying agent, the mold- inhibiting agent and the waterproofing agent can penetrate into the space between the leaves. Preferably, the concentration of the alykl glucoside in the solutions is about 0.05% by weight.

In this way, the preferential wetting of the different portions of the cut plants by the solution constituting this invention can be controlled by adjusting the concentration of the surface active agent in the solution to control the surface tension of the leaves in such cut plants. The surface active agent such as alkyl glucoside is also effective in being able to withstand high concentrations of alkali (such as at a pH of at least 11) and electrolytes without becoming insoluble (salting out).

When the concentration of the solution containing the drying agents, the mold-inhibiting agent, the waterproofing agent and the surface-active agent is varied, changes do not have to be made in the amount of such agents per pound of dried harvested crop. This results from the fact that changes in concentration per pound of cut plants can be inversely related to the rate at which the solution containing such various agents is applied. For example, when the concentration of the solution is increased because the amount of moisture on the cut plants is increased, the rate of applying the material to the plants can be decreased because the material is diluted by the moisture on the plants. For normal conditions of humidity, the amount of water used is about twenty (20) gallons per ton of cut dried plants. This corresponds to a concentration of approximately two and one half percent (2.5%) of the propionate by weight in the solution and to a concentration of approximately two and one half percent (2.5%) by weight of the drying agents in the solution.

The plants dried by the materials of this invention tend to pack more closely than the plants dried in the conventional manner of the prior art. For example, the plants dried by the material of this invention tend to weigh approximately one hundred and seventy five pounds (175 lbs.) per bale. In contrast, the plants dried in the conventional manner of the prior art tend to weigh approximately one hundred and forty pounds (140 lbs.) per bale. This increased density results in part because the leaves are retained on the plants when the plants are dried by the materials of this invention. Furthermore, the plants tend to be softer when dried by the materials of this invention than when dried in the conventional manner of the prior art. Since the plants are relatively soft, they can be packed more closely than in the prior art. This is advantageous in providing hay which will be comfortable in the mouths of cattle.

The drying of alfalfa (legume) may be expressed by the following equation;

$$dM/dT = K_1(M-M_e)a_sb_2c_1,$$

where
M = moisture content;
$M_e$ = equilibrium moisture content = 0.279 Exp (−0.5395)
L = leaf:stem ratio; and
S = saturation deficit (KPa), a function of humidity.

These relationships have not remained invariant under different field conditions. For example, if there are relatively large air spaces between the various forage stems and leaves, the cut plants may dry relatively quickly and uniformly so that S will assume the value of the outside atmosphere. If the stems and leaves are packed closely together, their circulation will be reduced. This will cause the value of S to be relatively small. The air spaces also become reduced when the forage starts to decay before it is dried. This results from the fact that the forage tends to soften as it decays so that air spaces are reduced. In view of the above, it is important to decrease the drying time constants and to inhibit the decaying process.

The material of this invention is applied to the plants after the plants have been bent. By bending the plants, the material can be applied as a spray along the full length of the stems and on the leaves. The plants are cut at a position near the stems and the cut plants may then be brought together to define a windrow. The windrow is preferably high and loosely packed to facilitate the circulation of air through the windrow. In this way, the drying of the plants is facilitated. Alternatively, the cut plants may be laid flat on the ground. If desired, the cut plants may be manually assembled into loose packs constituting the equivalent of windrows.

The application of the materials of this invention is somewhat dependent upon the particular plants being cut and dried. For example, when alfalfa is being dried, the materials of this invention are applied primarily to the stems since the leaves tend to become dried even when a relatively small amount of such materials is applied to the leaves. It will be appreciated that some of the materials will be applied to the leaves even when the spray is directed only against the stems. This results in part from the fact that the materials of this invention tend to become transferred to the leaves as the plants are cut and are passed through the rollers on the cutting and windrowing apparatus.

When plants such as grass and plants of the peanut family are to be dried, the materials of this invention are applied to the stems and the leaves. This results from the fact that the leaves tend to retain moisture because of their rolled characteristics and because of the action of the petioles on the leaves.

Under ordinary circumstances, a period as long as four (4) days, and sometimes even longer, is required to dry cut plants such as grass and alfalfa. Such long periods of time are undesirable for several reasons. One reason is that weather is unpredictable. As a result, as the time required to dry the cut plants is increased, the possibility of rain during that time increases. Furthermore, the tendency for the cut plants to mold or decay increases as the time required for the drying increases. The cut plants also tend to respire as they lie in the fields and they tend to loose nutrients as they respire.

The materials of this invention tend to dry the cut plants such as alfalfa and other types of legumes in a period of less than two (2) days. This is in contrast to a drying period of eight (8) to twelve (12) days, for example, in the Imperial Valley of California during the winter when the plants such as alfalfa are dried in the conventional manner of the prior art. (A drying time considerably less than eight (8) to twelve (12) days is, of course, required in the Imperial Valley in the summer.). During the drying process, molding of the cut leaves is inhibited. This is important in preserving the leaves on the cut plants. Since the leaves provide more nutrients than the stems, the preservation of the leaves on the cut plants is highly advantageous. The relatively fast drying also minimizes respiration of the plants and accordingly preserves the nutrients in the plants. The cut plants in each windrow are preferably raked or turned approximately an hour or less before being baled.

When the cut plants are raked, they are accumulated in a windrow of shortened lateral dimension and increased height. This facilitates the baling operation. When the cut plants are turned, the cut plants at the bottom of the windrow now appear at the top of the windrow. This gives these cut plants an opportunity to be dried. This is desirable because the cut plants near the bottom of the windrow tend to accumulate moisture such as from the dew on the ground. However, the accumulation of dew in the cut plants is relatively insignificant because of the action of the waterproofing agent. When the cut plants are turned, they may be raked before being baled.

Even under optimum conditions such as raking or turning the windrow about an hour or less before baling, there is a moisture variation of about four percent (4%) to five percent (5%) within a bale. In a well-packed bale, the moisture does not equalize significantly within the curing interval. As a result, a high moisture region of several cubic inches will continue to exist during the curing process. Although hay of a moisture level of a substantially uniform twenty percent (20%) or twenty one percent (21%) may be mold free, hay with an average moisture level of approximately twenty percent (20%) and peak moisture regions of approximately twenty five percent (25%) can develop pockets of spoilage. Such pockets of spoilage can then spread relatively quickly throughout the bale and prevent the bale from being ingestable by the animals.

The need to dry the cut plants quickly and uniformly indicates the importance of providing the pH of the drying agents in the solution with a high and controlled value, such as in the order of 12.4 to 13.2, to obtain the drying of the cut plants in a minimal period of time. It also indicates the importance of including the surface-active agent such as alkyl glucoside in the solution to obtain a penetration of the solution into all of the areas of the cut plants where the moisture exists. It also indicates the importance of including the mold inhibiting agent with the drying agents. It further indicates the importance of including the waterproofing agent to prevent the dried cut plants from reabsorbing water drops and droplets. For the purposes of this invention, "dried cut plants" may be considered as plants where the moisture level is uniformly less than twenty percent (20%).

In addition to decreasing the drying time and retaining the leaves, the materials of this invention offer other advantages. For example, tests have shown that the nutrient value of alfalfa produced in the conventional manner of the prior art is approximately fifty-seven percent (57%). These tests have also shown that the nutrient value of alfalfa hay produced by the materials of this invention is increased to approximately sixty-two percent (62%). Although the increase in nutrient value appears to be only approximately five percent (5%), this increase is quite significant because a dairy cow will not give milk if it is consuming hay with a nutrient value as high as fifty percent (50%) nutrient value. For example, this represents a relative increase in feed value from approximately 115 to approximately 160. Furthermore, the amount of milk delivered by a dairy cow increases rapidly as the nutrient value of the hay consumed by the cow increases above fifty percent (50%).

Tests have also shown that the protein content of the hay dried by the materials and methods of this invention are also increased significantly over the protein content of the hay dried by conventional methods. For example, hay dried by conventional methods has a protein content of approximately 15.8%. In contrast, the protein content of hay dried by the materials and methods of this invention is approximately 18.3%. As will be appreciated, an increase in the protein content of the hay is significant in increasing the nutrient value of the hay.

Suitable apparatus for applying the solution of this invention to the plants is shown in FIG. 1. Such apparatus includes a movable vehicle generally indicated at 10. The apparatus further includes at least one (1) pushbar 12 attached to the vehicle 10 for bending the plants in the direction and movement of the vehicle, this direction being indicated by an arrow 14. The push bar 12 may be disposed at a suitable distance such as approximately one foot above the ground.

When the plants 16 to be cut are relatively short, the push bar 12 may be sufficient. However, when the plants 16 are relatively tall, an additional push bar 18 may be provided. The push bar 18 may be disposed above and forwardly of the push bar 12 in the direction 14 of movement of the vehicle. It will be appreciated that additional pushbars may be provided if needed or desired.

A spray bar 20 is disposed above and rearwardly of the push bars 12 and 18. The spray bar 20 may be provided with nozzles 22 at spaced positions in the lateral direction. The nozzles 22 and the spray bar 20 are disposed to direct the solution in a spray 24 along the length of the plant stem and on the leaves of the plants. The spray 24 may be obtained from a storage container 25.

A cutter bar 26 is disposed rearwardly of spray bar 20 at a position near the bottom of the plant stems. An auger 28 may be disposed rearwardly of the cutter bar 26 to collect the cut plants in a high, loosely packed windrow 30. When an auger is used, the auger 28 also tends to spread any excess solution along the stems and leaves of the plants. The auger 28 may be constructed in a conventional manner. Rollers 32 also tend to squeeze the cut plants to force air and water out of the plants and to facilitate the replacement of such displaced fluids with the solution of this invention as the plants expand after being squeezed. This enhances the action of the drying agent and the mold inhibiting agent of this invention.

As previously described, the leaves of the plants 16 tend to mold easier than the stems. Furthermore, the leaves of the plants 16 tend to dry faster than the stems. In view of this, a different solution may be applied to the leaves than to the stems. This may be obtained by providing a pair of storage containers 60 and 62 and a pair of spray bars 64 and 66. The spray bars 64 and 66 are respectively coupled to the storage containers 60 and 62. The container 60 may hold a solution primarily formed from the drying agent, and the spray bar 64 may direct this solution primarily to the stems. The container 62 may hold a solution primarily formed from the mold inhibiting agent, and the spray bar 66 may direct this solution primarily to the leaves.

Apparatus may be included for controlling the rate at which the material of this invention is applied to the plants. Such apparatus may include a pressure sensor such as a panel 70 which is disposed adjacent the push bar 12 to sense the force of the plants on the push bar. This force is indicative of the volume of the cut plants per unit of area. This force is converted to an electrical signal which is applied to a control mechanism 72. The control mechanism 72 in turn varies the rate at which the solution from a container 74 flows through a spray nozzle 76. A similar arrangement may be associated with the push bar 18 to control the rate at which spray from a container 78 flows through a nozzle 80.

The rate of application of the spray 24 to the plants 16 depends upon the concentration of the solution and the rate at which the plants are cut. Since the solution is applied through spray nozzles 22, the nozzle sizes will determine the actual flow rate.

The formula for determining the nozzle flow may be expressed as follows:

$$\text{Flow rate} = \frac{\text{crop density} \times \text{vehicle speed} \times \text{application ratio}}{\text{solution concentration} \times \text{nozzle spacing density}}$$

For example, with a concentration of 3.3% by weight of the drying agent, a vehicle speed of four hundred feet (400') per minute, a nozzle spacing of one half foot (0.5'), a crop density of two (2) tons per acre and a desired application ratio of five (5) pounds of drying agent per ton of crop, the nozzle flow rate should be approximately twenty one hundredths (0.21) gallons per minute per nozzle.

The nozzle flow rate may be precisely controlled as on a digital basis. For example, a second spray bar 40 may be provided with nozzles 42. The nozzles 42 may have an opening one half the size of the openings 22 in the spray bar 20. A valve 44 may be associated with the spray bar 40 to control the flow of the solution through the spray bar. Similarly, a valve 46 may be associated with the spray bar 20 to control the flow of fluid through the spray bar.

Flip-flops 48 and 50 may be respectively associated with the valves 44 and 46. The triggering of the flip-flops 48 and 50 to the true state respectively opens the valves 44 and 46. A triggering of the flip-flops 48 and 40 to the false states respectively closes the valves 44 and 46. By triggering the flip-flops 48 and 50 selectively to the true state, the rate of flow of the solution through the nozzles may be controlled at twenty-five percent (25%), fifty percent (50%), seventy-five percent (75%) and one hundred percent (100%) of full flow. Furthermore, the addition of other spray bars with nozzles of progressively decreasing size will produce further digital refinements in the rate of flow.

As previously described, the leaves of the plants 16 tend to mold easier than the stems. Furthermore, the leaves of the plants 16 tend to dry faster than the stems. In view of this, a different solution may be applied to the leaves than to the stems. This may be obtained by providing a pair of storage containers 60 and 62 and a pair of spray bars 64 and 66. The spray bars 64 and 66 are respectively coupled to the storage containers 60 and 62. The container 60 may hold a solution primarily formed from the drying agents, the waterproofing agent and the surface active agent and the spray bar 64 may direct this solution primarily to the stems. The container 62 may hold a solution primarily formed from the mold inhibiting agent, the waterproofing agent and the surface active agent and the spray bar 66 may direct this solution primarily to the leaves.

The materials of this invention are intended to be used primarily in drying various types of plants after the plants have been cut. These plants include alfalfa, grass and plants of the peanut family. However, the materials of this invention can also be applied to grains such as wheat and corn, after the wheat and corn have been removed from the plants, to dry such grains. In this way, the grains can be sorted in bins and other storage areas without molding.

In one application of the materials of this invention, the following materials were applied in a spray to the plants in an alfalfa field in Gainesville, Fla., during a rainy, foggy climate on Aug. 13, 1981:

(1) Five pounds (5 lb) of potassium carbonate per ton of dried cut hay;

(2) One pound (1 lb ) of sodium metasilicate per ton of dried cut hay;

(3) Five pounds (5 lbs) of sodium propionate per ton of dried cut hay;

(5) Two percent (2%) of sodium methyl siliconate per weight of the solution; and (6) Five hundredths of one percent (0.05%) of alkyl glucoside per weight of the solution.

(7) Thirty (30) gallons of water.

This ratio between the carbonate and the metasilicate provides a pH approaching 12.5 in the solution. The material was applied to the plants, before cutting, by the apparatus of this invention. The plants were baled after approximately twenty-four (24) hours. At that time, the percentage of water in the bale was less than twenty percent (20%). The bales were tested periodically thereafter. Such tests showed that the percentage of water in the bales decreased progressively, with time, below twenty percent (20%).

In contrast, other tests were conducted simultaneously with the tests described in the previous paragraph. In these other tests, some of the plants were sprayed only with water at the same rate as the application of water in the previous paragraph. In other simultaneous tests, only potassium carbonate was mixed with water in the same concentration as in the previous paragraph and this mixture was applied to plants. In still other tests, a combination of the sodium metasilicate, the potassium carbonate and the sodium propionate was mixed in water in the ratios discussed in the previous paragraph.

The plants receiving only a water spray, the plants receiving a spray of potassium carbonate and water and the plants receiving a spray of the sodium metasilicate, the potassium carbonate and the sodium propionate and water were cut and baled at the same times as the plants described in the previous paragraph. The plants receiving only water spray required a period in excess of twenty (20) days to dry sufficiently so that the moisture content was less than twenty percent (20%). The plants receiving a spray of potassium carbonate and water did not have a moisture of less than twenty percent (20%) for a period of at least twelve (12) days. The plants receiving a spray of sodium metasilicate, potassium carbonate and sodium propionate and water were dried to a moisture content of approximately twenty percent (20%) in less than five (5) days Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A material for use in a solution for drying cut plants, the material consisting of:
    a first drying agent providing a pH in the solution in the range of at least 12.4, and
    a second drying agent providing a buffering action in the solution with the first drying agent to limit the pH of the first drying agent in the solution to the range of approximately 12.4 to 13.2.

2. The material set forth in claim 1 wherein
    the first drying agent is a silicate and
    the second drying agent is a carbonate.

3. The material set forth in claim 2 wherein
    the metasilicate has approximately one (1) to three (3) parts by weight in the material and
    the carbonate has approximately five (5) to two (2) parts by weight in the material.

4. The material set forth in claim 1 wherein
    the first drying agent is sodium metasilicate and
    the second drying agent is a carbonate of a positive ion selected from a group consisting of sodium and potassium.

5. The material set forth in claim 4 wherein
    the sodium metasilicate and
    the sodium carbonate or potassium carbonate have substantially equal concentrations by weight in the material.

6. In combination for use in a solution for drying cut plants, a material consisting of:
    a first drying agent providing a pH in the solution in the range of at least 12.4, and
    a second drying agent providing a buffering action in the solution with the first drying agent to limit the pH of the first drying agent to the range of approximately 12.4 to 13.2,
    a mold inhibiting agent having properties of becoming active at a pH below approximately 6 to inhibit the formation of molds in the dired cut plants.

7. A material for use in a solution for drying cut plants, the material consisting of:
    a first drying agent providing a pH in the solution in the range of at least 12.4, and
    a second drying agent providing a buffering action in the solution with the first drying agent to limit the pH of the first drying agent to the range of approximately 12.4 to 13.2,
    a surface active agent for facilitating the penetration of the solution to the leaves and a waterproofing agent for providing for a passage of moisture vapor between the leaves and the atmosphere while preventing water drops from affecting the leaves.

8. A material for use in a solution for drying cut plants, the material consisting of:
    a first drying agent having a basic pH and providing a colloidal suspension in the solution, and
    a second drying agent having a basis pH and providing a buffering action with the first drying agent in the solution to limit the basic pH of the solution to a particular value and cooperating with the first drying agent to provide a protective coating on the plants when applied to the plants.

9. The material set forth in claim 8,
    the first drying agent providing a pH of at least 12.4 and
    the second drying agent limiting the pH to a maximum value of approximately 13.2.

10. The material set forth in claim 8 wherein
    the first and second drying agents react to form a complex which provides a protective coating on particular portions of the cut plants.

11. The material set forth in claim 10 wherein
    the protective complex produced on the cut plants is in the form of a gel and wherein the first and second drying agents are applied primarily to the stems of the plants to produce the protective complex primarily on the stems of the cut plants.

12. The material set forth in claim 11 wherein
    the first drying agent is a silicate and
    the second drying agent is a carbonate.

13. The material set forth in claim 12 wherein
    the first and second drying agents provide a pH in the solution of approximately 10 to 11 and wherein a mold-inhibiting agent is included in the solution and is provided with characteristics of becoming active when the plants ferment to produce a pH below 6.

14. The material set forth in claim 12 wherein
the silicate is a metasilicate and
the first and second drying agents provide a pH between approximately 12.4 and 13.2 in the solution and wherein a mold-inhibiting agent is included in the solution and is provided with characteristics of becoming active when the plants ferment to produce a pH below approximately 6.

15. A material for use in a solution for drying cut plants, the material consisting of:
a first drying agent having properties of providing a basic pH and a colloidal suspension in an aqueous solution, and
a second drying agent having properties of providing a basic pH and a buffering action with the first drying agent in the solution to limit the pH of the solution to a particular value and of cooperating with the first drying agent to provide a protective coating on the plants when applied to the plants,
a surface active agent having properties of facilitating the penetration of the solution in the space occupied by the leaves, and
waterproofing agent having properties of providing for the passage of water vapor between the leaves and the atmosphere while inhibiting the passage of water drops to the leaves.

16. The material set forth in claim 15 wherein
the first drying agent is a metasilicate and has approximately one (1) to three (3) parts by weight in the material and
the second drying agent is a carbonate and has approximately five (5) to two (2) parts by weight in the material.

17. A material for use in a solution for drying cut plants, the material consisting of:
a first drying agent having a basic pH in the solution and having properties of saponifying the surfaces of the stems on the cut plants, and
a second drying agent having a basic pH in the solution and having properties of reacting with the first drying agent in the solution to produce a complex on the surface of the stems for protecting the plants.

18. The material set forth in claim 17 wherein
the first drying agent and the second drying agent provide a pH in the solution of approximately 10 to 11 for application primarily to the leaves of the plants.

19. The material set forth in claim 18 wherein
the first drying agent is a silicate and the second drying agent is selected from a group consisting of carbonates and phosphates.

20. The material set forth in claim 17 wherein
the first drying agent provides a pH of at least 12.4 and the second drying agent constitutes a buffer for limiting the pH of the first drying agent to a maximum of approximately 13.2 when the first and second drying agents are disposed in a solution.

21. The material set forth in claim 17 wherein
the first drying agent is a silicate and the second drying agent is a carbonate.

22. The material set forth in claim 21 wherein
the first drying agent and the second drying agent have approximately equal weights in the material.

23. A composition for use in a solution for drying cut plants where the cut plants have wax on the plants, consisting of:
drying agents providing a colloidal suspension in the solution and providing basic properties to the solution and providing a buffering action in the solution to limit the pH of the solution to a particular value and providing a saponification of the wax on the cut plants and providing a protective coating on the cut plants.

24. A composition as set forth in claim 23 wherein
the drying agents provide a pH in the solution of at least 12.4 and less than 13.2 when applied to the cut plants.

25. A composition as set forth in claim 23 wherein
the drying agents provide a PH in the solution between approximately 10 and 11 when applied to the cut plants 26. A composition as set forth in claim 23 wherein
the drying agents provide a pH between approximately 12.4 and 13.2 in the solution for application primarily to the stems of the cut plants.

27. A composition as set forth in claim 23 wherein
the drying agents provide a pH between approximately 10 and 11 for application primarily to the leaves of the cut plants.

28. A composition for use in a solution for drying cut plants where the cut plants have wax on the plants, including:
drying agents providing a colloidal suspension in the solution and providing basic properties to the solution and providing a buffering action in the solution to limit the pH of the solution to a particular value and providing a saponification of the wax on the cut plants and providing a protective coating on the cut plants, and
a mold inhibiting agent mixed with the drying agent and having properties of remaining inactive for different basic pH conditions in the solution until the occurrence in the solution of particular acidic conditions inducing molding of the plants and having properties of reacting with moisture under such particular acidic conditions in the solution to inhibit the molding of the cut plants.

29. A composition as set forth in claim 28, including,
waterproofing agent having properties in the solution of providing for the passage of moisture through the cut plants but inhibiting water drops and droplets from being re-absorbed on the cut plants.

30. A composition as set forth in claim 28, including,
a surface active agent for facilitating the penetration of the drying agent in the solution into the cut plants.

31. A composition as set forth in claim 30, including,
a waterproofing agent having properties in the solution of providing for the passage of moisture through the cut plants but inhibiting water drops and droplets from being re-absorbed on the cut plants.

32. A composition as set forth in claim 28 wherein the drying agents constitute a silicate and a carbonate.

33. A composition as set forth in claim 32 wherein
a siliconate is included in the composition as a waterproofing agent.

34. a composition for use in a solution for drying cut plants where the cut plants have wax on the plants, consisting of:

drying agents providing a colloidal suspension in the solution and providing basic properties to the solution and providing a buffering action in the solution to limit the pH of the solution to a particular value and providing a saponification of the wax on the cut plants and providing a protective coating on the cut plants, a waterproofing agent having properities in the solution of providing for the passage of moisture through the cut plants but inhibiting water drops and droplets from being re-absorbed on the cut plants.

35. A composition for use in a solution for drying cut plants where the cut plants have wax on the plants, consisting of:

drying agents providing a colloidal suspension in the solution and providing basic properaties to the solution and providing a buffering action in the solution to limit the pH of the solution to a particular value and providing a saponification of the wax on the cut plants and providing a protective coating on the cut plants, a surface active agent for facilitating the penetration of the drying agents in the solution into the cut plants.

* * * * *